Figure 1:
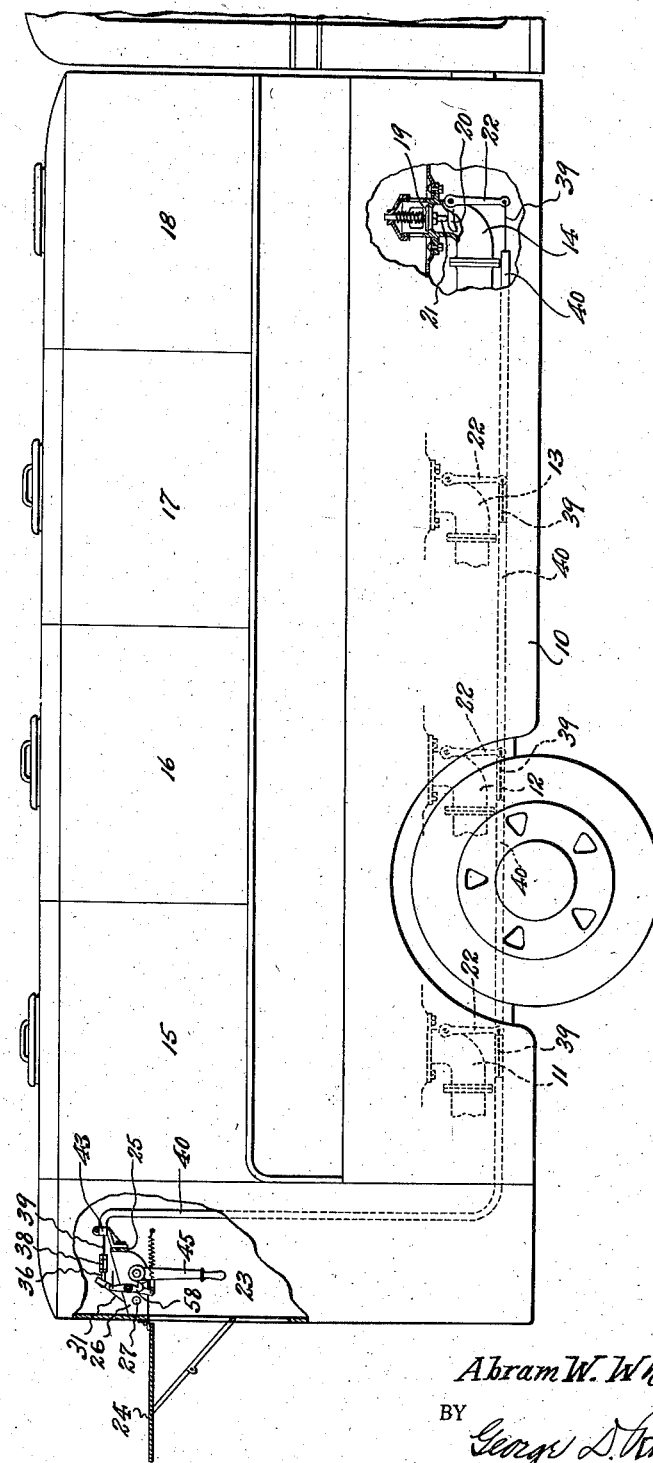

Jan. 17, 1939.  A. W. WHEATON  2,144,212
SELECTIVE REMOTE CONTROL MECHANISM
Filed Oct. 2, 1937  2 Sheets-Sheet 1

INVENTOR.
Abram W. Wheaton,
BY
George D. Richards
ATTORNEY.

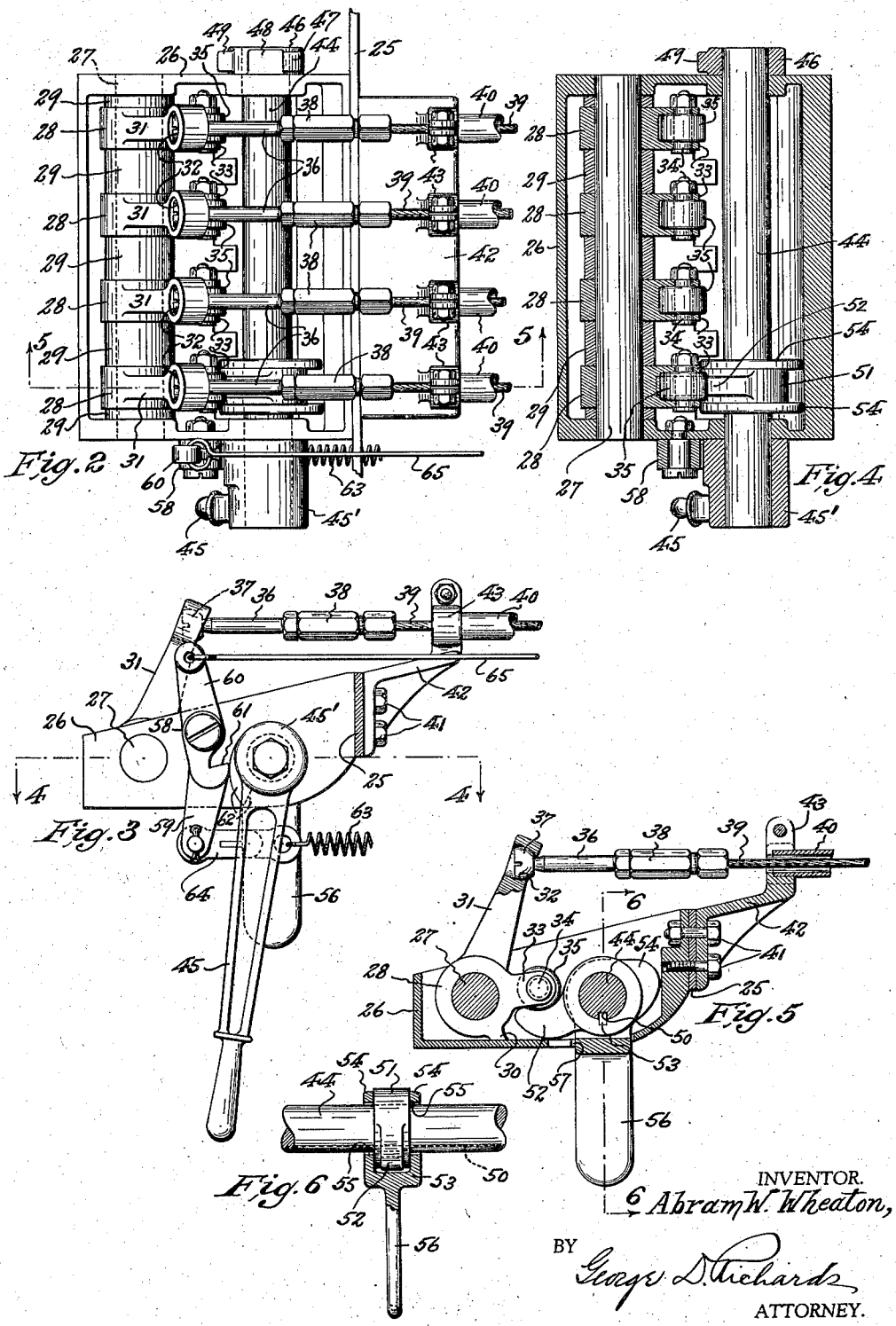

Patented Jan. 17, 1939

2,144,212

UNITED STATES PATENT OFFICE 2,144,212

SELECTIVE REMOTE CONTROL MECHANISM

Abram W. Wheaton, Maplewood, N. J., assignor to A. W. Wheaton Brass Works, Newark, N. J., a corporation of New Jersey Application October 2, 1937, Serial No. 167,075

5 Claims. (Cl. 74—471)

The present invention relates to improvements in control mechanism for selectively actuating remotely situated devices, valves, etc., and, the invention has reference, more particularly, to a novel selective control and actuating means for opening the emergency valves at the bottoms of the respective chambers of a compartment tank truck such as used for transporting various kinds of fluids, and especially fluids such as oil and gasoline.

This invention has for an object to provide a very simple, compact and easily operated mechanism for the purposes stated, wherein there are a plurality of actuators for transmitting operating motion to the remote devices desired to be selectively operated, a common manipulating means, and an easily and quickly adjustable means for engaging said manipulating means selectively with any given actuator.

The invention has for a further object to provide a detent means cooperative with the manipulating means of the control mechanism to retain the same in operated position until manually released subject however to automatic release in the event of fire.

Other objects of this invention not at this time more particularly enumerated, will be understood from the following detailed description of the same.

An illustrative embodiment of the selective remote control mechanism made according to this invention is shown in the accompanying drawings, in which:—

Fig. 1 is a side elevation, with parts in section, of a portion of a compartment tank truck equipped with the novel selective remote control means for actuating the emergency valves of its tank compartments.

Fig. 2 is a plan view of the selective remote control means per se; Fig. 3 is an end elevational view of the same; Fig. 4 is a horizontal sectional view thereof, taken on line 4—4 in Fig. 3; Fig. 5 is a transverse vertical sectional view thereof, taken on line 5—5 in Fig. 2; and Fig. 6 is a fragmentary sectional view, taken on line 6—6 in Fig. 5.

Similar characters of reference are employed in the above described views, to indicate corresponding parts.

Referring to the drawings, to illustrate the use and operation of the novel selective remote control means of the instant invention, the same has been shown as applied to the rear of a tank truck 10 for controlling the opening of emergency valves 11, 12, 13 and 14 with which the respective compartments 15, 16, 17 and 18 of the truck are provided. Said emergency valves are each provided with a spring closed valve member 19, adapted to be opened against the tension of its closing spring by means of a pivoted lift or thrust cam 20, which cooperates with an axial dependent stud 21 with which the valve member is provided, said cam being provided with an exteriorly arranged lever arm 22 by which it may be operatively turned.

The selective remote control means is located within the accessible interior of a rear compartment 23 with which the tank truck is provided, and which is commonly called the bucket box, the same being normally closed by a suitable door member 24. Suitably affixed within said compartment 23, as e. g. in connection with a carrier bar 25 or other suitable supporting frame means, is a casing member 26. Journaled in and between the end walls of said casing member 26 is a fulcrum shaft 27. Pivotally fulcrumed on said fulcrum shaft 27 are a plurality of bell-crank members 28, the same being laterally spaced apart in given locations by interposed spacing collars 29. Said bell-crank members 28 correspond in number to the number of emergency valves desired to be controlled. Each bell-crank member 28 is provided with a stop projection 30 which, by engagement with the bottom wall of said casing member, determines its normal initial or inactive position. Each bell-crank member 28 is provided with an upwardly extending arm 31 provided at its upper free end portion with a socket portion 32. Each bell-crank member 28 is also provided with a bifurcated lever arm 33 angularly disposed relative to the arm 31. Mounted upon an axle pin 34 supported in and across the bifurcated free end of said lever arm 33 in an anti-friction roller 35.

Cooperating with the arms 31 of said bell-crank member 28 is a terminal stem 36 having a ball-element 37 at one end to engage in the socket portion 32 of said bell-crank arm 31. Each terminal stem 36 is provided at its opposite end with a suitable coupling connection 38 for connecting thereto a pull-cable 39. Said pull-cables 39 respectively extend to and are operatively connected with the lever arms 22 of the respective emergency valves aforesaid.

Means are provided for operatively guiding the pull-cables 39 as extended between said respective bell-crank members and said respective emergency valves; said means comprising tubular guide conduits 40 through which said pull-cables slidably extend.

Connected with casing member 26 and carrier bar or frame 25, by fastener bolts 41, is a bracket member 42, having split clamp members 43 to receive, embrace and fix in position the receiving ends of said guide conduits 40 for the extension of the pull-cables thereinto.

The interconnection of the arms 31 of said bell-crank members 28 with the lever arms 22 of the respective emergency valves by means of the pull-cables 39 transmits the valve closing tension of the springs serving the valve members 19 to the respective bell-crank members 28 so that the latter are normally disposed in initial inactive positions as determined by the engagement of the stop projections 30 with the bottom wall of the casing member 26. When occupying said initial inactive positions, the arms 31 of said bell-crank members 28 are disposed in a forwardly swung position, as shown in the drawings.

Journaled in and between the end walls of said casing 26, to extend parallel to and forwardly spaced from said fulcrum shaft 27, is a rock-shaft 44, the ends of which respectively project exteriorly of the respective end walls of said casing 26. Affixed to one exteriorly projecting end of said rock-shaft 44 is a hand lever 45 for actuating the same. Affixed to the other exteriorly projecting end of said rock-shaft 44 is a stop collar 46. Projecting from the periphery of said stop-collar 46 is a stop-lug 47 adapted to abut one side of a fixed stop-projection 48 which projects from the adjacent end wall of said casing 26; this stop-lug 47, when so abutting the stop-projection 48, functions to determine the normal initial or inactive position of the rock-shaft 44. Also projecting from the periphery of said stop collar 46, in suitably circumferentially spaced relation to said stop-lug 47, is a second stop-lug 49 adapted, upon rock-shaft actuating movement of said hand lever 45, to abut the opposite side of said fixed stop-projection 48 so as to limit the manipulated movement of said hand lever 45, and thus determine the operative position of said rock-shaft 44.

Said rock-shaft 44 is provided with a longitudinally extending spline groove or channel 50. Slidably movable upon and along said rock-shaft 44 is the hub 51 of an actuator cam 52, the same being keyed to the rock-shaft so as to turn therewith by means of a feather or key 53 with which the hub 51 is provided, and which is slidably movable through and along the spline groove or channel 50 with which said rock-shaft is provided. Means for slidably adjusting and disposing said actuator cam along the rock-shaft so as to selectively dispose the same in operative relation to any one of the lever arms 33 of the bell-crank members 28, comprises a shift yoke 54 adapted to embrace between its arms the hub 51 of said actuator cam 52. Said shift yoke arms are provided with openings 55 through which the rock-shaft 44 extends. Said shift yoke 54 is further provided with a depending handle or finger piece 56, and the bottom wall of said casing 26 is provided with an open slot or way 57 through which said handle or finger piece 56 projects to be accessibly disposed exteriorly beneath the casing 26 for the manipulation of said shift yoke and said actuator cam.

Pivotally mounted on the exterior face of the casing end wall, adjacent to which said hand lever 45 is disposed, is a detent member 58 adapted to cooperate with said hand lever for releasably retaining the same in its manipulated operative position. Said detent member 58 is provided with a depending lever arm 59 and an oppositely or upwardly extending lever arm 60.

Formed in connection with said detent member and its depending lever arm 59 is a latch nosing or hook 61 adapted to cooperate with a latch lug 62 projecting from and affixed to the hub 45' of said hand lever 45. Said detent member and its latch nosing or hook 61 is biased in an anti-clockwise direction by a tensioned pull spring 63 connected with the free end of said depending lever arm 59 by means of a fusible coupling link 64. Connected with the free end of said upwardly extending lever arm 60 of said detent member is a pull wire 65 or equivalent means arranged to extend to and to be manipulated from a point at the front of the tank truck, preferably accessible from the driver's seat or cab.

When it is desired to open any one of the emergency valves 11 to 14 inclusive, the operator opens the bucket box door 24, and by grasping the handle or finger piece 56 of the shift yoke 54 moves the same along the rock-shaft 44 to thereby shift the actuator cam hub 51 to a position wherein its cam portion 52 underlies the lever arm 33 and roller 35 of the particular bell-crank member 28 to which emergency valve selected to be opened is connected.

Having thus set the control device for the operation of a given selected emergency valve, the operator thereupon grasps and pulls outwardly upon the hand lever 45 thus rotating the rock-shaft 44, and by the turning thereof imparting to the actuator cam 52 an upswinging movement. The upswinging movement of the actuator cam 52 thrusts upwardly upon the overlying antifriction roller 35 of the lever arm 33 of the bell-crank member 28 to which said actuator cam has been operatively related, causing an anti-clockwise turning of the latter about the fulcrum shaft 27. This movement of the actuated bell-crank member swings rearwardly its arm 31, thereby exerting an outward or rearward pull upon the cable 39 connected therewith, and in turn swinging the emergency valve lever arm 22 to which the cable is connected in a direction operative to cause the valve lift cam 20 to raise the valve member 19 off its seat and against the compression of its closing spring, thus opening said emergency valve to the flow of fluid outwardly therethrough from the tank compartment by which it is served, so as to flow into and through the tank truck compartment discharge line.

Just before the operative outward swinging movement of the hand lever 45 is arrested by the engagement of the stop lug 49 with the stop projection 48, the latch lug 62 of the hand lever hub passes the biased latch nosing or hook 61, which yields to such movement, and then under the pull of its biasing spring interlocks with said latch lug 62, thus releasably holding the hand lever 45 in its operated position, and the emergency valve actuating devices in the positions effective to hold the emergency valve open against the closing tension or compression of its spring. When it is desired to close the thus opened emergency valve, the operator merely pushes the hand-lever back to normal initial position, the force exerted in so doing being sufficient to releasably rock the detent member against the tension of its biasing spring 63.

If while the emergency valve is held open by the engagement of the detent means with the hand lever as described, a fire should occur, the resultant heat will part the fusible link 64, thus releasing the detent member from the restraint of its biasing spring, whereupon the hand lever will swing by gravity to its normal initial position, and the tension of the emergency valve closing spring will be transmitted through the valve parts and pull cable 39 so as to cause the connected bell-crank member to likewise return to normal initial position. A like release of the operated hand lever with consequent closing of the operated emergency valve and actuating parts associated therewith, may be manually attained from the forward end of the tank truck, by pulling the pull wire 65 which swings forward the lever arm 60 of the detent member so as to turn the latter to release the latch nosing or hook from its detaining engagement with the latch lug 62 of the hand lever hub.

From the foregoing it will be apparent that the instant invention provides a very simple, compact, and easily set and actuated remote control means which is well adapted to control selectively any one of a plurality of remotely situated devices, such e. g. as emergency valves of a plurality of tank truck compartments.

It will be understood that various modifications, as to size, shape, number of actuating elements and detail construction of the various parts and elements of the device may be made without departing from the spirit of my invention or the scope of the appended claims. It is therefore intended that all matter contained in the above description or shown in the accompanying drawings shall be interpreted as illustrative and not in a limiting sense.

I claim:—

1. Selective remote control mechanism comprising, a fixed casing, a fulcrum shaft extending through said casing, a plurality of bell-crank members pivotally mounted on said fulcrum shaft, means interconnecting upstanding arms of said bell-crank members respectively with remotely situated devices to be operated, said bell-crank members having stop means to determine their normal initial positions, a rock-shaft also extending through said casing, an actuating cam slidable on said rock-shaft but keyed thereto to turn therewith, a shift yoke member embracing said actuating cam and having a finger piece for manipulating the same to move and dispose said actuating cam in operative relation to the horizontal arm of a selected bell-crank member, said casing having a slot in its bottom beneath said rock-shaft through which said finger piece externally projects and along which it may be moved, and a hand lever for operating said rock-shaft.

2. Selective remote control mechanism comprising, a fixed casing, a fulcrum shaft extending through said casing, a plurality of bell-crank members pivotally mounted on said fulcrum shaft, means interconnecting upstanding arms of said bell-crank members respectively with remotely situated devices to be operated, said bell-crank members having stop means to determine their normal initial positions, a rock-shaft also extending through said casing, an actuating cam slidable on said rock-shaft but keyed thereto to turn therewith, a shift yoke member embracing said actuating cam and having a finger piece for manipulating the same to move and dispose said actuating cam in operative relation to the horizontal arm of a selected bell-crank member, said casing having a slot in its bottom beneath said rock-shaft through which said finger piece externally projects and along which it may be moved, a hand lever for operating said rock-shaft, a detent means for holding said hand lever in operated position, said detent means being yieldable to return of said hand lever to normal initial position by manual operation thereof, and a thermal device for automatically releasing said detent means.

3. Selective remote control mechanism for a plurality of tank compartment emergency valves each having a spring closed valve member and operating means for opening said valve member against the tension of its closing spring comprising, a fixed casing frame, a fulcrum shaft supported by said casing frame, a plurality of bell-crank members pivotally mounted on said fulcrum shaft and corresponding in number to the number of said emergency valves, motion transmitting means interconnected between upstanding arms of said bell-crank members and the operating means of corresponding emergency valves, each bell crank member having a casing frame engaging stop projection to determine the normal initial position thereof corresponding to the closed position of the emergency valve connected therewith, a rock-shaft supported by said casing frame parallel to said fulcrum shaft, an actuating cam slidable on said rock-shaft but keyed thereto to turn therewith, a shift yoke member embracing said actuating cam and having a finger piece for manipulating the same to selectively move and dispose said actuating cam in operative relation to the horizontal arm of a bell-crank member corresponding to the emergency valve desired to be opened, and a hand lever for operating said rock-shaft.

4. Selective remote control mechanism for a plurality of tank compartment emergency valves each having a spring closed valve member and operating means for opening said valve member against the tension of its closing spring comprising, a fixed casing frame, a fulcrum shaft supported by said casing frame, a plurality of bell-crank members pivotally mounted on said fulcrum shaft and corresponding in number to the number of said emergency valves, motion transmitting means interconnected between upstanding arms of said bell-crank members and the operating means of corresponding emergency valves, each bell-crank member having a casing frame engaging stop projection to determine the normal initial position thereof corresponding to the closed position of the emergency valve connected therewith, a rock-shaft supported by said casing frame parallel to said fulcrum shaft, an actuating cam slidable on said rock-shaft but keyed thereto to turn therewith, a shift yoke member embracing said actuating cam and having a finger piece for manipulating the same to selectively move and dispose said actuating cam in operative relation to the horizontal arm of a bell-crank member corresponding to the emergency valve desired to be opened, a hand lever for operating said rock-shaft, a detent means for holding said hand lever in operated position, said detent means being yieldable to return of said hand lever to normal initial position by manual operation thereof, and a thermal device for automatically releasing said detent means.

5. Selective remote control mechanism for a plurality of tank compartment emergency valves each having a spring closed valve member and operating means for opening said valve member against the tension of its closing spring comprising, a fixed casing frame, a fulcrum shaft supported by said casing frame, a plurality of bell-crank members pivotally mounted on said fulcrum shaft and corresponding in number to the number of said emergency valves, a pull cable extending between the respective upstanding arms of said bell-crank members and the respective operating means of said emergency valves, coupling means between said pull cables and said upstanding arms of said bell-crank members including a ball and socket connection with the latter, guide conduits for said cables, a rock-shaft supported by said casing frame parallel to said fulcrum shaft, an actuating cam slidable on said rock-shaft but keyed thereto to turn therewith, a shift yoke member embracing said actuating cam and having a finger piece for manipulating the same to move and dispose said actuating cam in operative relation to the horizontal arm of a selected bell-crank member, a hand lever for operating said rock-shaft, a detent means for holding said hand lever in operated position, said detent means being yieldable to return of said hand lever to normal initial position by manual operation thereof, and a thermal device for automatically releasing said detent means.

ABRAM W. WHEATON.